United States Patent
Czernobil et al.

(10) Patent No.: US 11,607,950 B2
(45) Date of Patent: Mar. 21, 2023

(54) TRANSMISSION SYSTEM FOR A WORK VEHICLE

(71) Applicant: CNH Industrial America LLC, New Holland, PA (US)

(72) Inventors: Alek Nicholas Czernobil, Lemont, IL (US); Richard A. Miller, Racine, WI (US)

(73) Assignee: CNH Industrial America LLC, New Holland, PA (US)

( * ) Notice: Subject to any disclaimer, the term of this patent is extended or adjusted under 35 U.S.C. 154(b) by 133 days.

(21) Appl. No.: 17/319,696

(22) Filed: May 13, 2021

(65) Prior Publication Data

US 2021/0354556 A1 Nov. 18, 2021

Related U.S. Application Data

(60) Provisional application No. 63/024,727, filed on May 14, 2020.

(51) Int. Cl.

| | |
|---|---|
| *F16H 3/091* | (2006.01) |
| *B60K 17/08* | (2006.01) |
| *B60K 17/344* | (2006.01) |
| *B60K 17/28* | (2006.01) |
| *F16H 3/093* | (2006.01) |

(52) U.S. Cl.
CPC .............. *B60K 17/08* (2013.01); *B60K 17/28* (2013.01); *B60K 17/344* (2013.01); *F16H 3/093* (2013.01); *F16H 2200/0017* (2013.01); *F16H 2200/0078* (2013.01); *F16H 2200/0082* (2013.01)

(58) Field of Classification Search
CPC ........ F16H 3/091; B60K 17/08; B60K 17/344
USPC .................................................. 74/325, 331
See application file for complete search history.

(56) References Cited

U.S. PATENT DOCUMENTS

| | | | |
|---|---|---|---|
| 2,888,998 A | 6/1959 | Senkowski et al. | |
| 3,916,714 A | * 11/1975 | Sisson | ..................... F16H 3/093 |
| | | | 74/331 |
| 4,275,607 A | 6/1981 | Snoy | |
| 4,354,400 A | 10/1982 | Baker | |
| 4,513,850 A | 4/1985 | Plate | |

(Continued)

FOREIGN PATENT DOCUMENTS

CN        201153368        11/2008

OTHER PUBLICATIONS

TractorData, John Deere, 6420L—Transmission, 2016, 3 pgs, http://www.tractordata.com/farm-tractors/006/7/9/6796-john-deere-6420l-transmission.html.

*Primary Examiner* — Ha Dinh Ho
(74) *Attorney, Agent, or Firm* — Rickard DeMille; Rebecca Henkel

(57) ABSTRACT

A powershift transmission for a work vehicle includes a speed section. Within the speed section, a speed C clutch is engageable to transfer rotational power from a speed input shaft to a speed countershaft via first and second speed gears, a speed A clutch is engageable to transfer rotational power from the speed input shaft to the speed countershaft via third and fourth speed gears, and a speed B clutch is engageable to transfer rotational power from the speed input shaft to the speed countershaft via fifth and sixth speed gears. A first gear ratio between the first and second speed gears is greater than a second gear ratio between the third and fourth speed gears and a third gear ratio between the fifth and sixth speed gears.

20 Claims, 4 Drawing Sheets

(56) References Cited

U.S. PATENT DOCUMENTS

| | | | | |
|---|---|---|---|---|
| 4,824,128 A | * | 4/1989 | Takagi | B60K 17/28 |
| | | | | 74/15.84 |
| 5,063,793 A | | 11/1991 | McAskill | |
| 5,117,702 A | | 6/1992 | Rodeghiero et al. | |
| 5,245,892 A | * | 9/1993 | Kim | F16H 37/043 |
| | | | | 74/342 |
| 5,248,283 A | * | 9/1993 | Eckhardt | F16H 37/042 |
| | | | | 74/413 |
| 5,493,927 A | * | 2/1996 | Botterill | F16H 3/093 |
| | | | | 74/331 |
| 5,494,142 A | | 2/1996 | Kale | |
| 5,573,471 A | * | 11/1996 | Shubinsky | F16H 37/046 |
| | | | | 475/322 |
| 6,692,395 B2 | | 2/2004 | Rodeghiero et al. | |
| 6,845,682 B1 | * | 1/2005 | Bulgrien | F16H 3/66 |
| | | | | 74/331 |
| 7,730,807 B2 | | 6/2010 | Kim et al. | |
| 8,596,157 B2 | * | 12/2013 | Vu | F16H 37/043 |
| | | | | 74/331 |

\* cited by examiner

| GEAR | C | A | B | REVERSE | SPEED 1 | SPEED 2 | SPEED 3 | RANGE L | RANGE M | RANGE H |
|------|---|---|---|---------|---------|---------|---------|---------|---------|---------|
| 1  | X |   |   |   | X |   |   | X |   |   |
| 2  | X |   |   |   |   | X |   | X |   |   |
| 3  | X |   |   |   |   |   | X | X |   |   |
| 4  |   | X |   |   | X |   |   | X |   |   |
| 5  |   |   | X |   | X |   |   | X |   |   |
| 6  |   | X |   |   |   | X |   | X |   |   |
| 7  |   |   | X |   |   | X |   | X |   |   |
| 8  |   | X |   |   |   |   | X | X |   |   |
| 9  |   |   | X |   |   |   | X | X |   |   |
| 10 |   | X |   |   | X |   |   |   | X |   |
| 11 |   |   | X |   | X |   |   |   | X |   |
| 12 |   | X |   |   |   | X |   |   | X |   |
| 13 |   |   | X |   |   | X |   |   | X |   |
| 14 |   | X |   |   |   |   | X |   | X |   |
| 15 |   |   | X |   |   |   | X |   | X |   |
| 16 |   | X |   |   | X |   |   |   |   | X |
| 17 |   |   | X |   | X |   |   |   |   | X |
| 18 |   | X |   |   |   | X |   |   |   | X |
| 19 |   |   | X |   |   | X |   |   |   | X |
| 20 |   | X |   |   |   |   | X |   |   | X |
| 21 |   |   | X |   |   |   | X |   |   | X |
| R1 | X |   |   | X |   |   |   | X |   |   |
| R2 |   | X |   | X |   |   |   | X |   |   |
| R3 |   |   | X | X |   |   |   | X |   |   |
| R4 |   | X |   | X |   |   |   |   | X |   |
| R5 |   |   | X | X |   |   |   |   | X |   |

FIG. 4

TRANSMISSION SYSTEM FOR A WORK VEHICLE

CROSS-REFERENCE TO RELATED APPLICATION

This application claims priority from and the benefit of U.S. Provisional Application Ser. No. 63/024,727, entitled "TRANSMISSION SYSTEM FOR A WORK VEHICLE," filed May 14, 2020, which is hereby incorporated by reference in its entirety.

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Transmissions are used in agricultural and construction equipment to transmit power from power sources, such as internal combustion engines, to equipment for accomplishing a desired task. For example, transmissions are used to transmit power to wheels and/or tracks of a work vehicle. A powershift transmission is a transmission that controls the engagement and release of multiple clutches to switch between speeds/gears while maintaining a torque path through the transmission. Gear switching changes the speed of the work vehicle as well as the available torque. For example, switching to progressively higher gears my increase a work vehicle's speed while decreasing the available torque. Unfortunately, operating a work vehicle at a maximum speed may involve operating the engine at a maximum engine speed, which may increase noise and fuel consumption.

BRIEF DESCRIPTION

This summary is provided to introduce a selection of concepts that are further described below in the detailed description. This summary is not intended to identify key or essential features of the claimed subject matter, nor is it intended to be used as an aid in limiting the scope of the claimed subject matter.

In certain embodiments, a powershift transmission for a work vehicle includes a speed section having a speed input shaft configured to be driven in rotation by an input. The speed section also includes a speed countershaft and a speed A clutch coupled to the speed input shaft. In addition, the speed section includes a speed B clutch coupled to the speed input shaft and a speed C clutch coupled to the speed countershaft. Furthermore, the speed section includes a first speed gear coupled to the speed input shaft and configured to rotate with the speed input shaft, and the speed section includes a second speed gear coupled to the speed C clutch and engaged with the first speed gear. In addition, the speed section includes a third speed gear coupled to the speed A clutch, and the speed section includes a fourth speed gear coupled to the speed countershaft and configured to rotate with the speed countershaft. The fourth speed gear is engaged with the third speed gear. The speed section also includes a fifth speed gear coupled to the speed B clutch, and the speed section includes a sixth speed gear coupled to the speed countershaft and configured to rotate with the speed countershaft. The sixth speed gear is engaged with the fifth speed gear. In addition, the speed A clutch is engageable to transfer rotational power from the speed input shaft to the speed countershaft via the third and fourth speed gears, the speed B clutch is engageable to transfer rotational power from the speed input shaft to the speed countershaft via the fifth and sixth speed gears, and the speed C clutch is engageable to transfer rotational power from the speed input shaft to the speed countershaft via the first and second speed gears. Furthermore, a first gear ratio between the first and second speed gears is greater than a second gear ratio between the third and fourth speed gears and a third gear ratio between the fifth and sixth speed gears.

DRAWINGS

These and other features, aspects, and advantages of the present disclosure will become better understood when the following detailed description is read with reference to the accompanying drawings in which like characters represent like parts throughout the drawings, wherein:

FIG. 4 is an embodiment of a shift diagram corresponding to gear ratio changes within the transmission of FIG. 3, in accordance with the present disclosure.

DETAILED DESCRIPTION

Figure 1:
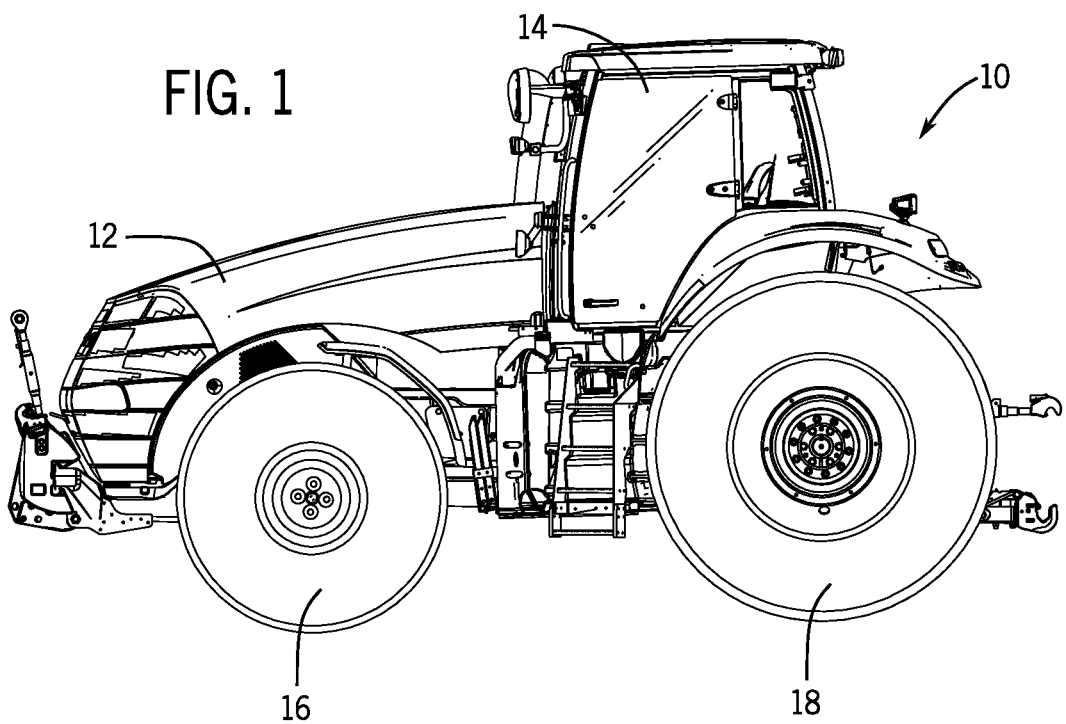
FIG. 1 is a side view of an embodiment of a work vehicle that may employ a transmission system, in accordance with the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "coupled" or "coupled to" may indicate establishing either a direct or indirect connection, and is not limited to either unless expressly referenced as such. The term "set" may refer to one or more items. Wherever possible, like or identical reference numerals are used in the figures to identify common or the same elements. The figures are not necessarily to scale and certain features and certain views of the figures may be shown exaggerated in scale for purposes of clarification.

Furthermore, when introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements.

Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

Certain transmissions include multiple gears and clutches configured to facilitate a change in the output speed of the transmission relative to the input speed. Changes in the output speed of the transmission change the speed of the work vehicle or other devices that receive power from the transmission. The transmission described below includes twenty-one forward speeds/gears and five reverse speeds/gears. Due to the gears of the transmission and a selection of engaged clutches, the work vehicle may travel at a maximum vehicle speed without operating the engine at a maximum engine speed. The work vehicle may, therefore, use less fuel and provide a quieter ride during operation (e.g., while the transmission is in the highest speed/gear, such as a road economy speed/gear).

With the foregoing in mind, FIG. 1 is a side view of an embodiment of a work vehicle 10 that may employ a transmission system. The work vehicle 10 may be any suitable type of loader, tractor, grader, backhoe, forklift, agricultural vehicle, or any other suitable work vehicle that utilizes a transmission. The work vehicle 10 has a body 12 that may house an engine, transmission, and power train. Further, the work vehicle 10 has a cabin 14 where an operator may sit or stand to operate the work vehicle 10. The work vehicle 10 has front wheels 16 and rear wheels 18 that rotate along the ground. The engine of the work vehicle 10 may drive the front wheels 16 and/or the back wheels 18 using the transmission. For example, a full powershift transmission system may transfer power from the engine to the front wheels 16 and/or the rear wheels 18. While the work vehicle 10 includes two front wheels 16 and two rear wheels 18 in the illustrated embodiment, in other embodiments, the work vehicle may include any suitable number of front wheels (e.g., 2, 4, etc.) and any suitable number of rear wheels (e.g., 2, 4, etc.). Furthermore, in certain embodiments, the work vehicle may include one or more sets of tracks driven by the transmission. For example, the work vehicle may include rear tracks instead of the rear wheel.

Figure 2:
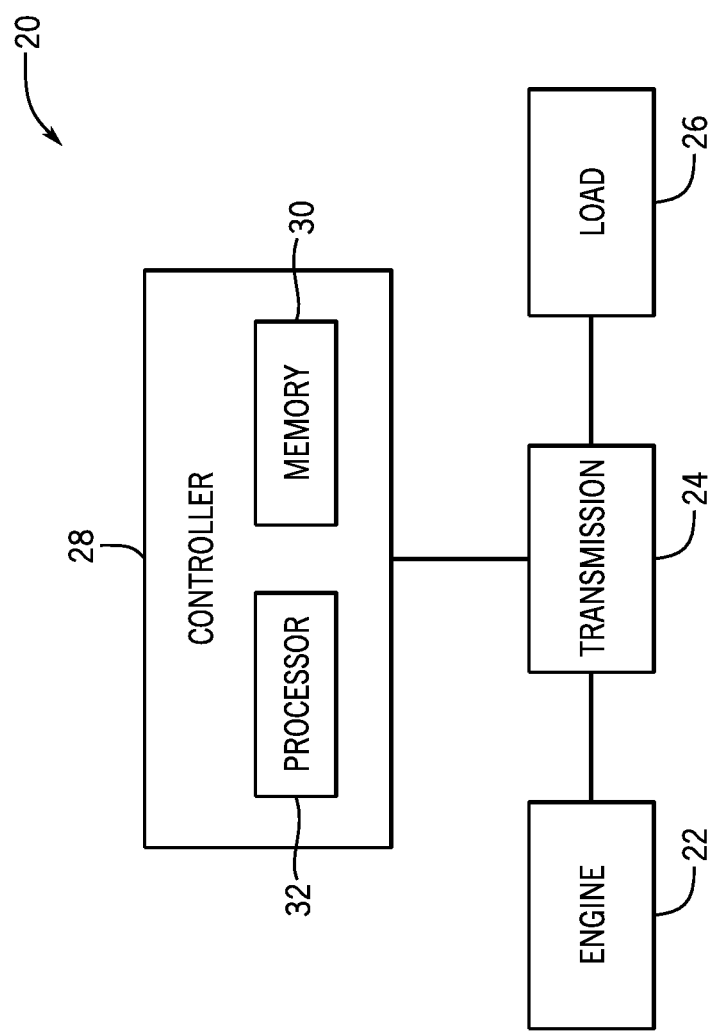
FIG. 2 is a block diagram of an embodiment of a transmission system that may be used in the work vehicle of FIG. 1, in accordance with the present disclosure.

FIG. 2 is a block diagram of an embodiment of a transmission system 20 that may be used in the work vehicle of FIG. 1. An engine 22 (e.g., an internal combustion engine) provides power to drive a transmission 24 of the transmission system 20. The transmission 24 (e.g., powershift transmission) may include a hydraulic system, a planetary gear unit, seals and gaskets, a torque converter, a modulator, sensor(s), other suitable components, or a combination thereof. Output from the transmission 24 drives a load 26, such as the wheels of the work vehicle. The transmission system 20 further includes a controller 28 configured to control various systems and units within the transmission 24. As illustrated, the controller 28 includes one or more memory devices 30 and one or more processors 32. For example, the one or more memory devices 30 may include volatile memory, such as random access memory (RAM), and/or non-volatile memory, such as read-only memory (ROM), optical drives, hard disc drives, solid-state drives, or a combination thereof. Additionally, the one or more processors 32 may include one or more application specific integrated circuits (ASICs), one or more field programmable gate arrays (FPGAs), one or more general purpose processors, or any combination thereof. Furthermore, the term processor is not limited to just those integrated circuits referred to in the art as processors, but broadly refers to computers, processors, microcontrollers, microcomputers, programmable logic controllers, ASICs, and other programmable circuits. The one or more memory devices 30 (e.g., non-transitory computer-readable medium/memory circuitry) may store one or more sets of instructions (e.g., processor-executable instructions) to operate the transmission 24. In operation, the controller 28 uses the one or more processors 32 to execute instructions stored in the one or more memory devices 30 to control the transmission 24. For example, the controller 28 may receive instructions to cause various clutches to be engaged/disengaged to cause gear ratio changes while the work vehicle 10 is moving (e.g., at different speeds).

Figure 3:
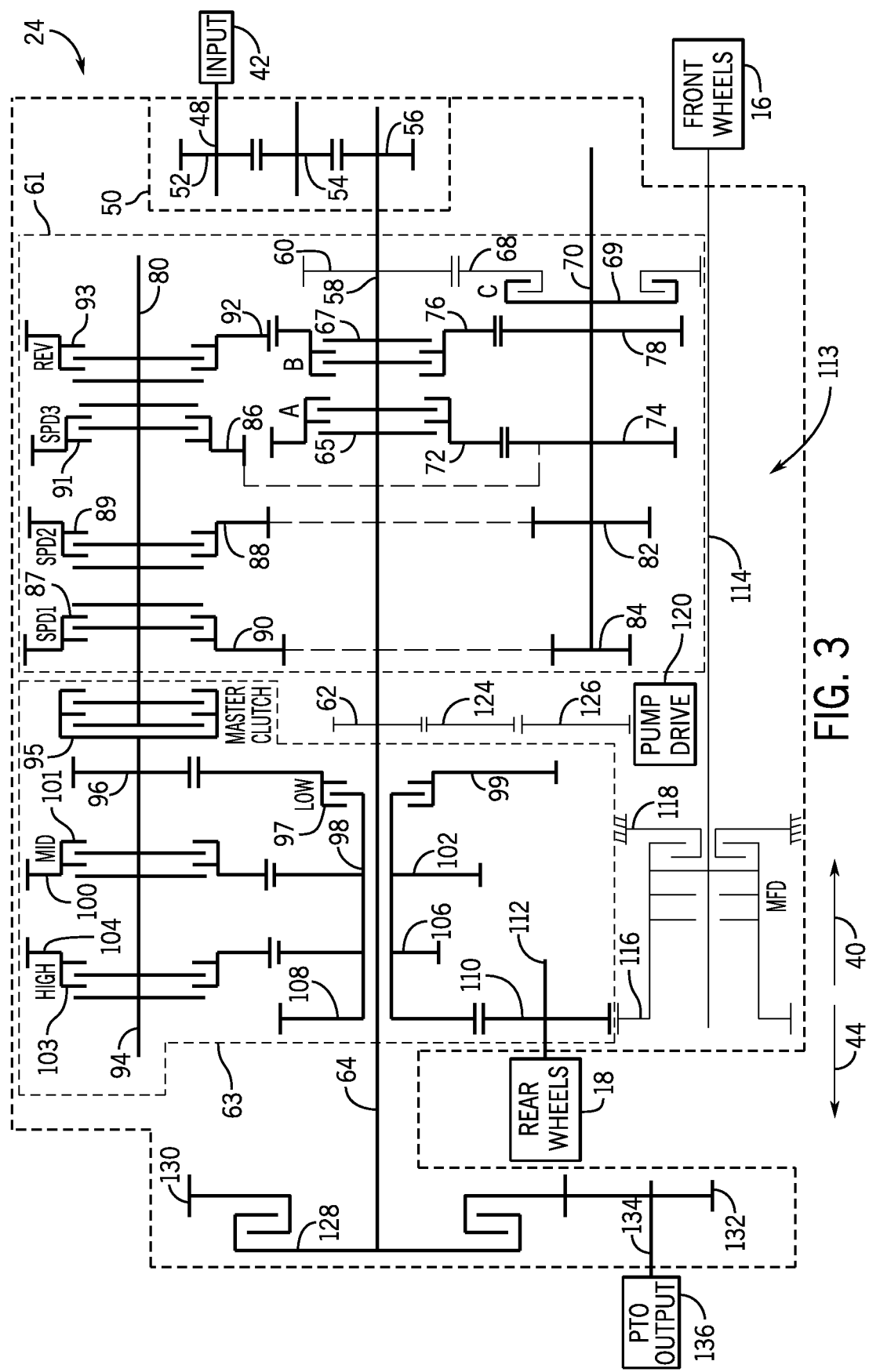
FIG. 3 is a schematic diagram of an embodiment of a transmission that may be used within the transmission system of FIG. 2, in accordance with the present disclosure.

FIG. 3 is a schematic diagram of an embodiment of a transmission 24 (e.g., powershift transmission) that may be used within the transmission system of FIG. 2. In the following description, an axial direction 40 pointing toward an input 42 is referred to as "a forward direction", and an axial direction 44 pointing toward a load or output (e.g., the rear wheels 18) is referred to as "a rearward direction". The input 42 may be a motor or the engine of the work vehicle, and the load or output may include the rear wheels 18. The input 42 couples to and drives rotation of a driveshaft 48, thereby enabling the transmission 24 to receive rotational power from the input 42.

As illustrated, the driveshaft 48 is an element of a dropbox 50. The dropbox 50 includes multiple gears. In the illustrated embodiment, the dropbox 50 includes a first dropbox gear 52, a second dropbox gear 54, and a third dropbox gear 56. The first dropbox gear 52 is coupled directly to the driveshaft 48 and configured to rotate with the driveshaft 48, and the third dropbox gear 56 is coupled directly to a speed input shaft 58 and configured to rotate with the speed input shaft 58. In addition, the first dropbox gear 52 is engaged with the second dropbox gear 54, and the second dropbox gear 54 is engaged with the third dropbox gear 56. In operation, the gears of the dropbox 50 drive the speed input shaft 58 at a speed greater than the speed of the driveshaft 48. In other words, the gears of the dropbox 50 establish a gear ratio that causes the speed input shaft 58 to rotate at a speed greater than the speed of the driveshaft 48. By way of example, the gears of the dropbox 50 may establish a gear ratio between the driveshaft 48 and the speed input shaft 58 of 0.706. In certain embodiments, the first dropbox gear 52 may have 34 teeth, the second dropbox gear 54 may have 35 teeth, and the third dropbox gear may have 24 teeth. Increasing the speed of the speed input shaft 58 (e.g., as compared to dropbox gears that establish a higher gear ratio between the driveshaft and the speed input shaft, such as 0.909) may reduce torque on clutches in the transmission 24, which may enable the transmission 24 to use smaller clutches, shafts, gears, or a combination thereof. As a result, the size and/or the manufacturing cost of the transmission may be reduced. As used herein, "gear ratio" refers to a torque multiplier between components (e.g., gear(s), shaft(s), etc.). For example, the gear ratio may be determined by dividing the number of teeth of the driven gear by the number of teeth of the driving gear.

As illustrated, the speed input shaft 58 is coupled directly to a first speed gear 60 within a speed section 61 of the transmission 24 and to a first pump drive gear 62. The first speed gear 60 is configured to rotate with the speed input shaft 58, and the first pump drive gear 62 is configured to rotate with the speed input shaft 58. In addition, the speed input shaft 58 is coupled to a speed A clutch 65 within the speed section 61 and to a speed B clutch 67 within the speed section 61. Furthermore, the speed input shaft 58 is coupled directly to a power take-off (PTO) input shaft 64. As illustrated, the first speed gear 60 is engaged with a second speed gear 68, and the second speed gear 68 is coupled to a speed C clutch 69 of the speed section 61. The speed C clutch 69 is configured to selectively couple the second speed gear 68 to a speed countershaft 70, thereby enabling power transmission from the speed input shaft 58 to the speed countershaft 70. In certain embodiments, the gear ratio between the first and second speed gears is 2.360. For example, the first speed gear 60 may have 25 teeth, and the second speed gear 68 may have 59 teeth. Due to the large gear ratio between the first and second speed gears, engaging the speed C clutch causes the speed countershaft to be driven with high torque and at a low speed (e.g., as compared to a configuration in which the gear ratio between the first and second speed gears is 0.795). As a result, the speed C clutch may be engaged to establish the lowest speeds/gears of the transmission, such as the first three forward speeds/gears and the first reverse speed/gear (e.g., as compared to a configuration in which the gear ratio between the first and second speed gears is less than 1.000, such as 0.795, and the speed C clutch is engaged for a highest speed/gear, such as an overdrive speed/gear).

Furthermore, the speed section 61 of the transmission 24 includes a third speed gear 72 and a fourth speed gear 74, in which the third speed gear 72 is engaged with the fourth speed gear 74. As illustrated, the third speed gear 72 is coupled to the speed A clutch 65, and the speed A clutch 65 is configured to selectively couple the third speed gear 72 to the speed input shaft 58. In addition, the fourth speed gear 74 is coupled to the speed countershaft 70 and configured to rotate with the speed countershaft 70. In certain embodiments, the gear ratio between the third and fourth speed gears is 1.147. For example, the third speed gear 72 may have 34 teeth, and the fourth speed gear 74 may have 39 teeth. In addition, the speed section 61 of the transmission 24 includes a fifth speed gear 76 and a sixth speed gear 78, in which the fifth speed gear 76 is engaged with the sixth speed gear 78. As illustrated, the fifth speed gear 76 is coupled to the speed B clutch 67, and the speed B clutch 67 is configured to selectively couple the fifth speed gear 76 to the speed input shaft 58. Furthermore, the sixth speed gear 78 is coupled to the speed countershaft 70 and configured to rotate with the speed countershaft 70. In certain embodiments, the gear ratio between the fifth and sixth speed gears is 1.000. For example, the fifth speed gear 76 may have 37 teeth, and the sixth speed gear 78 may have 37 teeth.

A selected one of the speed A clutch, the speed B clutch, or the speed C clutch may be engaged to establish a power transfer path from the speed input shaft 58 to the speed countershaft 70. For example, the speed A clutch 65 may be engaged while the speed B clutch 67 and the speed C clutch 69 are disengaged. Accordingly, the power transfer path extends from the speed input shaft 58 to the speed countershaft 70 via the third speed gear 72 and the fourth speed gear 74 (e.g., establishing a gear ratio of 1.147 between the speed input shaft and the speed countershaft). In addition, the speed B clutch 67 may be engaged while the speed A clutch 65 and the speed C clutch 69 are disengaged. Accordingly, the power transfer path extends from the speed input shaft 58 to the speed countershaft 70 via the fifth speed gear 76 and the sixth speed gear 78 (e.g., establishing a gear ratio of 1.000 between the speed input shaft and the speed countershaft). Furthermore, the speed C clutch 69 may be engaged while the speed A clutch 65 and the speed B clutch 67 are disengaged. Accordingly, the power transfer path extends from the speed input shaft 58 to the speed countershaft 70 via the first speed gear 60 and the second speed gear 68 (e.g., establishing a gear ratio of 2.360 between the speed input shaft and the speed countershaft). As such, the rotational speed of the speed countershaft 70 may be adjusted via engagement of a selected one of the speed A clutch, the speed B clutch, or the speed C clutch.

In the illustrated embodiment, the speed section 61 of the transmission 24 includes a seventh speed gear 82 and an eighth speed gear 84. The seventh speed gear 82 is coupled to the speed countershaft 70 and configured to rotate with the speed countershaft 70, and the eighth speed gear 84 is coupled to the speed countershaft 70 and configured to rotate with the speed countershaft 70. In addition, the fourth speed gear 74 is engaged with a ninth speed gear 86 of the speed section 61, the seventh speed gear 82 is engaged with a tenth speed gear 88 of the speed section 61, the eighth speed gear 84 is engaged with an eleventh speed gear 90 of the speed section 61, and the fifth speed gear 76 is engaged with a twelfth speed gear 92 of the speed section 61. In certain embodiments, the gear ratio between the fourth and ninth speed gears is 0.872. For example, the fourth speed gear 74 may have 39 teeth, and the ninth speed gear 86 may have 34 teeth. In addition, in certain embodiments, the gear ratio between the seventh and tenth speed gears is 1.147. For example, the seventh speed gear 82 may have 34 teeth, and the tenth speed gear 88 may have 39 teeth. Furthermore, in certain embodiments, the gear ratio between the eighth and eleventh speed gears is 1.517. For example, the eighth speed gear 84 may have 29 teeth, and the eleventh speed gear 90 may have 44 teeth. In addition, in certain embodiments, the gear ratio between the fifth and twelfth speed gears is 1.054. For example, the fifth speed gear 76 may have 37 teeth, and the twelfth speed gear 92 may have 39 teeth.

In the illustrated embodiment, the speed section 61 of the transmission 24 includes a speed 1 clutch 87 coupled to the eleventh speed gear 90 and to a speed output shaft 80, a speed 2 clutch 89 coupled to the tenth speed gear 88 and to the speed output shaft 80, a speed 3 clutch 91 coupled to the ninth speed gear 86 and to the speed output shaft 80, and a reverse clutch 93 coupled to the twelfth speed gear 92 and to the speed output shaft 80. A selected one of the speed 1 clutch, the speed 2 clutch, the speed 3 clutch, or the reverse clutch may be engaged to establish a power transfer path from the speed countershaft 70 or the speed input shaft 58 to the speed output shaft 80. For example, the speed 1 clutch 87 may be engaged while the speed 2 clutch 89, the speed 3 clutch 91, and the reverse clutch 93 are disengaged. Accordingly, the power transfer path extends from the speed countershaft 70 to the speed output shaft 80 via the eighth speed gear 84 and the eleventh speed gear 90 (e.g., establishing a gear ratio of 1.517 between the speed countershaft and the speed output shaft). In addition, the speed 2 clutch 89 may be engaged while the speed 1 clutch 87, the speed 3 clutch 91, and the reverse clutch 93 are disengaged. Accordingly, the power transfer path extends from the speed countershaft 70 to the speed output shaft 80 via the seventh speed gear 82 and the tenth speed gear 88 (e.g., establishing a gear ratio of 1.147 between the speed countershaft and the speed output shaft). Furthermore, the speed 3 clutch 91 may be engaged while the speed 1 clutch 87, the speed 2 clutch 89, and the reverse clutch 93 are disengaged. Accordingly, the power transfer path extends from the speed countershaft 70 to the speed output shaft 80 via the fourth speed gear 74 and the ninth speed gear 86 (e.g., establishing a gear ratio of 0.872 between the speed countershaft and the speed output shaft).

In addition, the reverse clutch 93 may be engaged while the speed 1 clutch 87, the speed 2 clutch 89, and the speed 3 clutch 91 are disengaged. Accordingly, if one of the speed A clutch or the speed C clutch is engaged, the power transfer path extends from the speed countershaft 70 to the speed output shaft 80 via the sixth speed gear 78, the fifth speed gear 76, and the twelfth speed gear 92 (e.g., establishing a gear ratio of 1.054 between the speed countershaft and the speed output shaft). As previously discussed, with one of the speed A clutch or the speed C clutch engaged, the speed B clutch is disengaged. Accordingly, the fifth speed gear 76 may rotate substantially freely about the speed input shaft 58. Furthermore, if the speed B clutch is engaged, the power transfer path extends from the speed input shaft 58 to the speed output shaft 80, bypassing the speed countershaft 70, via the fifth speed gear 76 and the twelfth speed gear 92 (e.g., establishing a gear ratio of 1.054 between the speed input shaft and the speed output shaft). By selectively engaging one of the speed 1 clutch, the speed 2 clutch, the speed 3 clutch, or the reverse clutch, the rotational speed/direction of the speed output shaft may be adjusted.

The speed output shaft 80 selectively couples to a range input shaft 94 of a range section 63 of the transmission 24 via a master clutch 95. In certain embodiments, the master clutch 95 is configured to vary a degree of engagement to control power flow through the transmission (e.g., during initiation of movement of the work vehicle, during shuttle shifting, etc.). In the illustrated embodiment, the range section 63 of the transmission 24 includes a first range gear 96 coupled to the range input shaft 94 and configured to rotate with the range input shaft 94. In addition, the range section 63 of the transmission 24 includes a range low clutch 97 coupled to a range countershaft 98. Furthermore, the range section 63 of the transmission 24 includes a second range gear 99 coupled to the range low clutch 97 and engaged with the first range gear 96. In certain embodiments, the gear ratio between the first and second range gears is 2.455. For example, the first range gear 96 may have 22 teeth, and the second range gear 99 may have 54 teeth. In addition, the range section 63 of the transmission 24 includes a third range gear 100 and a fourth range gear 102. The third range gear 100 is coupled to a range mid clutch 101 of the range section 63, and the range mid clutch 101 is coupled to the range input shaft 94. Furthermore, the fourth range gear 102 is coupled to the range countershaft 98 and configured to rotate with the range countershaft 98, and the fourth range gear 102 is engaged with the third range gear 100. In certain embodiments, the gear ratio between the third and fourth range gears is 1.054. For example, the third range gear 100 may have 37 teeth, and the fourth range gear 102 may have 39 teeth. Furthermore, the range section 63 of the transmission 24 includes a fifth range gear 104 and a sixth range gear 106. The fifth range gear 104 is coupled to a range high clutch 103 of the range section 63, and the range high clutch 103 is coupled to the range input shaft 94. Furthermore, the sixth range gear 106 is coupled to the range countershaft 98 and configured to rotate with the range countershaft 98, and the sixth range gear 106 is engaged with the fifth range gear 104. In certain embodiments, the gear ratio between the fifth and sixth range gears is 0.424. For example, the fifth range gear 104 may have 59 teeth, and the sixth range gear 106 may have 25 teeth.

A selected one of the range low clutch, the range mid clutch, or the range high clutch may be engaged to establish a power transfer path from the range input shaft 94 to the range countershaft 98. For example, the range low clutch 97 may be engaged while the range mid clutch 101 and the range high clutch 103 are disengaged. Accordingly, the power transfer path extends from the range input shaft 94 to the range countershaft 98 via the first range gear 96 and the second range gear 99 (e.g., establishing a gear ratio of 2.455 between the range input shaft and the range countershaft). In addition, the range mid clutch 101 may be engaged while the range low clutch 97 and the range high clutch 103 are disengaged. Accordingly, the power transfer path extends from the range input shaft 94 to the range countershaft 98 via the third range gear 100 and the fourth range gear 102 (e.g., establishing a gear ratio of 1.054 between the range input shaft and the range countershaft). Furthermore, the range high clutch 103 may be engaged while the range low clutch 97 and the range mid clutch 101 are disengaged. Accordingly, the power transfer path extends from the range input shaft 94 to the range countershaft 98 via the fifth range gear 104 and the sixth range gear 106 (e.g., establishing a gear ratio of 0.424 between the range input shaft and the range countershaft). As such, the rotational speed of the range countershaft may be adjusted via engagement of a selected one of the range low clutch, the range mid clutch, or the range high clutch.

In the illustrated embodiment, the range section 63 of the transmission 24 includes a seventh range gear 108 coupled to the range countershaft 98 and configured to rotate with the range countershaft 98. The range section 63 of the transmission 24 also includes an eighth range gear 110 engaged with the seventh range gear 108. The eighth range gear 110 is coupled to a rear axle input shaft 112 and configured to rotate with the rear axle input shaft 112, and the rear axle input shaft 112 is configured to drive the rear wheels 18 to rotate. In certain embodiments, the gear ratio between the seventh and eighth range gears is less than 1.900, such as 1.808. For example, the seventh range gear 108 may have 26 teeth, and the eighth range gear 110 may have 47 teeth. Due to the gear ratio between the seventh and eighth range gears, the rear axle input shaft 112 may be driven to rotate at a high speed (e.g., as compared to a transmission in which the seventh and eighth range gears establish a gear ratio of 2.000). As a result, the maximum speed of the work vehicle may be achieved with an engine speed that is less than the maximum engine speed, thereby reducing noise and increasing fuel efficiency. Furthermore, due to the gear ratio between the seventh and eighth range gears, the rear axle input shaft 112 may be driven to rotate with a lower torque (e.g., as compared to a transmission in which the seventh and eighth range gears establish a gear ratio of 2.000). Due to the lower torque, the transmission may utilize smaller clutches, shafts, gears, or a combination thereof, thereby reducing the size and/or the manufacturing cost of the transmission. In certain embodiments, the rear wheels may be coupled to the rear axle input shaft via bevel gears that establish a suitable gear ratio (e.g., 4.909).

In some situations, it may be desirable to drive the front wheels 16 to rotate (e.g., while the work vehicle is operating in low traction conditions). To provide power to the front wheels 16, the transmission 24 includes a mechanical front-wheel drive (MFD) system 113 having an MFD driveshaft 114 that is coupled to the front wheels 16. Power is transferred to the MFD driveshaft 114 through an MFD gear 116 and an MFD clutch 118. As illustrated, the MFD gear 116 is engaged with the eighth range gear 110, and the MFD clutch 118 is coupled to the MFD gear 116 and to the MFD driveshaft 114. Accordingly, while the MFD clutch 118 is engaged, power is transferred from the MFD gear 116 to the front wheels 16. In certain embodiments, the gear ratio between the eighth range gear 110 and the MFD gear 116 is 1.000. For example, the eighth range gear 110 may have 47 teeth, and the MFD gear 116 may have 47 teeth. In certain embodiments, the front wheels 16 may be coupled to the MFD driveshaft 114 via bevel gears that establish a suitable gear ratio (e.g., 3.083).

Additional systems may couple to and receive power from the transmission 24. These systems may include a pump drive 120 and a PTO output 136. In the illustrated embodiment, the first pump drive gear 62, which is coupled to the speed input shaft 58 and configured to rotate with the speed input shaft 58, is engaged with a second pump drive gear 124. In addition, the second pump drive gear 124 is engaged with a third pump drive gear 126, and the third pump drive gear 126 is coupled to the pump drive 120. In certain embodiments, the gear ratio between the first pump drive gear 62 and the third pump drive gear 126 is 0.981. For example, the first pump drive gear 62 may have 54 teeth, the second pump drive gear 124 may have 61 teeth, and the third pump drive gear 126 may have 53 teeth. Accordingly, the pump drive may be driven to rotate by the pump drive gears faster than the speed input shaft 58. In addition, in certain embodiments, the gear ratio between the first dropbox gear 52 and the third pump drive gear 126 is 0.693. As a result, the pump drive may be driven at a high speed (e.g., as compared to a transmission in which the gear ratio between the first dropbox gear and the third pump drive gear is 0.707). While the transmission includes three pump drive gears in the illustrated embodiment, in other embodiments, the transmission may include more or fewer pump drive gears (e.g., 1, 2, 3, 4, etc.).

Power is also transferred from the speed input shaft 58 to the PTO output 136. In the illustrated embodiment, the PTO input shaft 64 is coupled to the speed input shaft 58. The PTO input shaft 64 is also coupled to a PTO clutch 128, and the PTO clutch 128 is coupled to a first PTO gear 130. In addition, the first PTO gear 130 is engaged with a second PTO gear 132, and the second PTO gear 132 is coupled to a PTO output shaft 134 and configured to rotate with the PTO output shaft 134. In certain embodiments, the gear ratio between the first and second PTO gears is 2.452. For example, the first PTO gear 130 may have 42 teeth, and the second PTO gear 132 may have 103 teeth. Furthermore, the PTO output shaft 134 is coupled to the PTO output 136. Accordingly, while the PTO clutch 128 is engaged, rotational power is transferred from the speed input shaft 58 to the PTO output 136.

In certain embodiments, a two-speed system may be coupled to the PTO output shaft. The two-speed system may include a series of gears configured to increase the gear ratio between the PTO output shaft and the PTO output. For example, in certain embodiments, the two-speed system includes a first gear coupled to the PTO output shaft and configured to rotate with the PTO output shaft. In addition, the first gear is engaged with a second gear, and the second gear is coupled to an intermediate shaft and configured to rotate with the intermediate shaft. A third gear is coupled to the intermediate shaft and configured to rotate with the intermediate shaft. The third gear is engaged with a fourth gear, and the fourth gear is coupled to a second PTO output shaft and configured to rotate with the second PTO output shaft. In certain embodiments, the gear ratio between the first and second gears is 1.172, and the gear ratio between the third and fourth gears is 1.583. Because the gear ratio between the PTO input shaft and the first PTO output shaft is 2.452 in certain embodiments, the total gear ratio between the PTO input shaft and the second PTO output shaft may be 4.549. For example, the first gear of the two-speed system may have 29 teeth, the second gear of the two-speed system may have 34 teeth, the third gear of the two-speed system may have 24 teeth, and the fourth gear of the two-speed system may have 38 teeth. The two-speed system may also include a selector assembly configured to selectively couple the first PTO output shaft to the PTO output or the second PTO output shaft to the PTO output. Accordingly, the rotation rate/torque at the PTO output may be controlled by selectively coupling the PTO output to a selected PTO output shaft.

In some embodiments, the transmission 24 of FIG. 3 may include one or more speed sensors, each configured to output a respective signal indicative of the rotational speed of a respective shaft. The speed sensor(s) may include reflective sensor(s), interrupter sensor(s), optical sensor(s), magnetic sensor(s), Hall-effect sensor(s), other suitable type(s) of sensor(s), or a combination thereof. The speed sensor(s) may continuously, periodically, or upon receiving an instruction from the controller output signal(s) indicative of rotational speed(s) of respective shaft(s) to the controller. Based on the signal(s) from the speed sensor(s), the controller may determine the rotational speed of respective shaft(s) of the transmission 24 and may determine whether respective clutch(es) of the transmission 24 are engaged.

The clutches described herein may be any suitable type(s) of clutch(es), including dry clutch(es), wet clutch(es), single/multi plate clutch(es), centrifugal clutch(es), pneumatic or hydraulic clutch(es), electromagnetic clutch(es), or any combination thereof. Each of the clutches may be configured to selectively couple a gear to a shaft or selectively couple a shaft to another shaft upon receiving a control signal from the controller (e.g., the controller 28).

Rotation of the various gears and shafts described above is controlled with the clutches (e.g., the speed A clutch, the speed B clutch, the speed C clutch, the speed 1 clutch, the speed 2 clutch, the speed 3 clutch, the reverse clutch, the master clutch, the range low clutch, the range mid clutch, the range high clutch, the MFD clutch, and the PTO clutch), such as to achieve different gear ratios (e.g., speeds) between the driveshaft 48 and the respective outputs (e.g., the rear axle input shaft, the MFD driveshaft, the third pump drive gear, and the PTO output shaft). For example, the clutches may be controlled (e.g., via the controller) to establish different power flow paths through the transmission, thereby achieving different speeds/gears in forward and reverse directions, as discussed in detail below.

Examples of the number of teeth on certain gears are disclosed above. However, in certain embodiments, at least one gear may have more or fewer teeth. For example, if a gear ratio between gears is disclosed, each gear may have any suitable number of teeth to achieve the disclosed gear ratio. Furthermore, any of the gear ratios disclosed above may be particularly selected for a desired transmission configuration (e.g., such that the gear ratio is different than the disclosed gear ratio). In addition, while the transmission is configured to output rotational power to the PTO output, the rear wheels, the pump drive, and the front wheel in the illustrated embodiment, in other embodiments, the transmission may be configured to output rotational power to more or fewer outputs/elements.

FIG. 4 is an embodiment of a shift diagram corresponding to gear ratio changes within the transmission of FIG. 3. As illustrated, the transmission is configured to provide twenty-one forward speeds/gears, from speeds/gears 1 to 21, and five reverse speeds/gears, from speeds/gears 1 to 5. The forward and reverse speeds/gears are illustrated in successive rows, with each speed/gear achievable via a power flow path through the transmission of FIG. 3. For each respective speed/gear, each clutch of the speed A, speed B, speed C, reverse, speed 1, speed 2, speed 3, range low, range mid, and range high clutches that is not indicated/described as being engaged is disengaged. Forward speed/gear 1 is achieved by engaging the speed C clutch, the speed 1 clutch, and the range low clutch. In certain embodiments, with the transmission in the forward speed/gear 1, the gear ratio through the transmission is 11.215. Forward speed/gear 2 is achieved by engaging the speed C clutch, the speed 2 clutch, and the range low clutch. In certain embodiments, with the transmission in the forward speed/gear 2, the gear ratio through the transmission is 8.479. Forward speed/gear 3 is achieved by engaging the speed C clutch, the speed 3 clutch, and the range low clutch. In certain embodiments, with the transmission in the forward speed/gear 3, the gear ratio through the transmission is 6.444.

Furthermore, forward speed/gear 4 is achieved by engaging the speed A clutch, the speed 1 clutch, and the range low clutch. In certain embodiments, with the transmission in the forward speed/gear 4, the gear ratio through the transmission is 5.451. Forward speed/gear 5 is achieved by engaging the speed B clutch, the speed 1 clutch, and the range low clutch. In certain embodiments, with the transmission in the forward speed/gear 5, the gear ratio through the transmission is 4.752. Forward speed/gear 6 is achieved by engaging the speed A clutch, the speed 2 clutch, and the range low clutch. In certain embodiments, with the transmission in the forward speed/gear 6, the gear ratio through the transmission is 4.121. Forward speed/gear 7 is achieved by engaging the speed B clutch, the speed 2 clutch, and the range low clutch. In certain embodiments, with the transmission in the forward speed/gear 7, the gear ratio through the transmission is 3.593. Forward speed/gear 8 is achieved by engaging the speed A clutch, the speed 3 clutch, and the range low clutch. In certain embodiments, with the transmission in the forward speed/gear 8, the gear ratio through the transmission is 3.132. Forward speed/gear 9 is achieved by engaging the speed B clutch, the speed 3 clutch, and the range low clutch. In certain embodiments, with the transmission in the forward speed/gear 9, the gear ratio through the transmission is 2.731.

In addition, forward speed/gear 10 is achieved by engaging the speed A clutch, the speed 1 clutch, and the range mid clutch. In certain embodiments, with the transmission in the forward speed/gear 10, the gear ratio through the transmission is 2.341. Forward speed/gear 11 is achieved by engaging the speed B clutch, the speed 1 clutch, and the range mid clutch. In certain embodiments, with the transmission in the forward speed/gear 11, the gear ratio through the transmission is 2.041. Forward speed/gear 12 is achieved by engaging the speed A clutch, the speed 2 clutch, and the range mid clutch. In certain embodiments, with the transmission in the forward speed/gear 12, the gear ratio through the transmission is 1.770. Forward speed/gear 13 is achieved by engaging the speed B clutch, the speed 2 clutch, and the range mid clutch. In certain embodiments, with the transmission in the forward speed/gear 13, the gear ratio through the transmission is 1.543. Forward speed/gear 14 is achieved by engaging the speed A clutch, the speed 3 clutch, and the range mid clutch. In certain embodiments, with the transmission in the forward speed/gear 14, the gear ratio through the transmission is 1.345. Forward speed/gear 15 is achieved by engaging the speed B clutch, the speed 3 clutch, and the range mid clutch. In certain embodiments, with the transmission in the forward speed/gear 15, the gear ratio through the transmission is 1.173.

Furthermore, forward speed/gear 16 is achieved by engaging the speed A clutch, the speed 1 clutch, and the range high clutch. In certain embodiments, with the transmission in the forward speed/gear 16, the gear ratio through the transmission is 0.941. Forward speed/gear 17 is achieved by engaging the speed B clutch, the speed 1 clutch, and the range high clutch. In certain embodiments, with the transmission in the forward speed/gear 17, the gear ratio through the transmission is 0.820. Forward speed/gear 18 is achieved by engaging the speed A clutch, the speed 2 clutch, and the range high clutch. In certain embodiments, with the transmission in the forward speed/gear 18, the gear ratio through the transmission is 0.711. Forward speed/gear 19 is achieved by engaging the speed B clutch, the speed 2 clutch, and the range high clutch. In certain embodiments, with the transmission in the forward speed/gear 19, the gear ratio through the transmission is 0.620. Forward speed/gear 20 is achieved by engaging the speed A clutch, the speed 3 clutch, and the range high clutch. In certain embodiments, with the transmission in the forward speed/gear 20, the gear ratio through the transmission is 0.541. Forward speed/gear 21 is achieved by engaging the speed B clutch, the speed 3 clutch, and the range high clutch. In certain embodiments, with the transmission in the forward speed/gear 21, the gear ratio through the transmission is 0.471.

In addition, with regard to the reverse speeds/gears, reverse speed/gear 1 is achieved by engaging the speed C clutch, the reverse clutch, and the range low clutch. In certain embodiments, with the transmission in the reverse speed/gear 1, the gear ratio through the transmission is 7.79. Reverse speed/gear 2 is achieved by engaging the speed A clutch, the reverse clutch, and the range low clutch. In certain embodiments, with the transmission in the reverse speed/gear 2, the gear ratio through the transmission is 3.79. Reverse speed/gear 3 is achieved by engaging the speed B clutch, the reverse clutch, and the range low clutch. In certain embodiments, with the transmission in the reverse speed/gear 3, the gear ratio through the transmission is 3.30. Reverse speed/gear 4 is achieved by engaging the speed A clutch, the reverse clutch, and the range mid clutch. In certain embodiments, with the transmission in the reverse speed/gear 4, the gear ratio through the transmission is 1.63. Reverse speed/gear 5 is achieved by engaging the speed B clutch, the reverse clutch, and the range mid clutch. In certain embodiments, with the transmission in the reverse speed/gear 5, the gear ratio through the transmission is 1.42.

As previously discussed, the controller may control engagement and disengagement of each clutch to achieve a desired speed/gear. For example, the controller may be communicatively coupled to an actuator of each clutch, and the controller may output a control signal to each actuator indicative of instructions to engaged or disengage the respective clutch. For example, the controller may cause the transmission to establish the first speed/gear by outputting signals indicative of instructions to engage the speed C clutch, the speed 1 clutch, and the range low clutch, and to disengage the speed A clutch, the speed B clutch, the reverse clutch, the speed 2 clutch, the speed 3 clutch, the range mid clutch, and the range high clutch.

Technical effects include a twenty-one forward speed/gear and a five reverse speed/gear transmission. The transmission enables the work vehicle to travel at a maximum vehicle speed while the engine operates below the maximum engine speed. The work vehicle may, therefore, use less fuel and provide a quieter ride during operation (e.g., while the transmission is in the highest speed/gear, such as a road economy speed/gear).

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrated and described may be re-arranged, and/or two or more elements may occur simultaneously.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A powershift transmission for a work vehicle, comprising:
   a speed section, comprising:
     a speed input shaft configured to be driven in rotation by an input;
     a speed countershaft;
     a speed A clutch coupled to the speed input shaft;
     a speed B clutch coupled to the speed input shaft;
     a speed C clutch coupled to the speed countershaft;
     a first speed gear coupled to the speed input shaft and configured to rotate with the speed input shaft;
     a second speed gear coupled to the speed C clutch and engaged with the first speed gear;
     a third speed gear coupled to the speed A clutch;
     a fourth speed gear coupled to the speed countershaft and configured to rotate with the speed countershaft, wherein the fourth speed gear is engaged with the third speed gear;
     a fifth speed gear coupled to the speed B clutch; and
     a sixth speed gear coupled to the speed countershaft and configured to rotate with the speed countershaft, wherein the sixth speed gear is engaged with the fifth speed gear;
     wherein the speed A clutch is engageable to transfer rotational power from the speed input shaft to the speed countershaft via the third and fourth speed gears, the speed B clutch is engageable to transfer rotational power from the speed input shaft to the speed countershaft via the fifth and sixth speed gears, and the speed C clutch is engageable to transfer rotational power from the speed input shaft to the speed countershaft via the first and second speed gears;
     wherein a first gear ratio between the first and second speed gears is greater than a second gear ratio between the third and fourth speed gears and a third gear ratio between the fifth and sixth speed gears.

2. The powershift transmission of claim 1, wherein the first gear ratio is more than twice the second gear ratio, and the first gear ratio is more than twice the third gear ratio.

3. The powershift transmission of claim 1, wherein the first gear ratio is 2.360.

4. The powershift transmission of claim 3, wherein the first speed gear has 25 teeth, and the second speed gear has 59 teeth.

5. The powershift transmission of claim 3, wherein the second gear ratio is 1.147, and the third gear ratio is 1.000.

6. The powershift transmission of claim 1, comprising a pump drive gear coupled to the speed input shaft and configured to rotate with the speed input shaft, wherein the pump drive gear is configured to drive a pump drive to rotate.

7. The powershift transmission of claim 1, comprising a power take-off (PTO) input shaft coupled to the speed input shaft, wherein the PTO input shaft is configured to drive rotation of a PTO output shaft.

8. The powershift transmission of claim 1, wherein the speed section comprises:
   a speed output shaft;
   a speed 1 clutch coupled to the speed output shaft;
   a speed 2 clutch coupled to the speed output shaft;
   a speed 3 clutch coupled to the speed output shaft;
   a seventh speed gear coupled to the speed countershaft and configured to rotate with the speed countershaft;
   an eighth speed gear coupled to the speed countershaft and configured to rotate with the speed countershaft;
   a ninth speed gear coupled to the speed 3 clutch and engaged with the fourth speed gear;
   a tenth speed gear coupled to the speed 2 clutch and engaged with the seventh speed gear; and
   an eleventh speed gear coupled to the speed 1 clutch and engaged with the eighth speed gear;
   wherein the speed 1 clutch is engageable to transfer rotational power from the speed countershaft to the speed output shaft via the eighth and eleventh speed gears, the speed 2 clutch is engageable to transfer rotational power from the speed countershaft to the speed output shaft via the seventh and tenth speed gears, and the speed 3 clutch is engageable to transfer rotational power from the speed countershaft to the speed output shaft via the fourth and ninth speed gears.

9. The powershift transmission of claim 8, wherein the speed section comprises:
   a reverse clutch coupled to the speed output shaft; and
   a twelfth speed gear coupled to the reverse clutch and engaged with the fifth speed gear;
   wherein the reverse clutch is engageable to transfer rotation power from the speed countershaft or the speed input shaft to the speed output shaft via the fifth speed gear and the twelfth speed gear.

10. A powershift transmission system for a work vehicle, comprising
   a controller comprising a memory and a processor;
   a powershift transmission comprising a speed section, comprising:
     a speed input shaft configured to be driven in rotation by an input;

a speed countershaft;
a speed A clutch coupled to the speed input shaft and communicatively coupled to the controller;
a speed B clutch coupled to the speed input shaft and communicatively coupled to the controller;
a speed C clutch coupled to the speed countershaft and communicatively coupled to the controller;
a first speed gear coupled to the speed input shaft and configured to rotate with the speed input shaft;
a second speed gear coupled to the speed C clutch and engaged with the first speed gear;
a third speed gear coupled to the speed A clutch;
a fourth speed gear coupled to the speed countershaft and configured to rotate with the speed countershaft, wherein the fourth speed gear is engaged with the third speed gear;
a fifth speed gear coupled to the speed B clutch; and
a sixth speed gear coupled to the speed countershaft and configured to rotate with the speed countershaft, wherein the sixth speed gear is engaged with the fifth speed gear;
wherein the speed A clutch is engageable to transfer rotational power from the speed input shaft to the speed countershaft via the third and fourth speed gears, the speed B clutch is engageable to transfer rotational power from the speed input shaft to the speed countershaft via the fifth and sixth speed gears, and the speed C clutch is engageable to transfer rotational power from the speed input shaft to the speed countershaft via the first and second speed gears;
wherein the controller is configured to output one or more signals indicative of instructions to engage the speed C clutch, to disengage the speed A clutch, and to disengage the speed B clutch to establish a highest gear ratio of the powershift transmission.

11. The powershift transmission system of claim 10, wherein a first gear ratio between the first and second speed gears is greater than a second gear ratio between the third and fourth speed gears and a third gear ratio between the fifth and sixth speed gears.

12. The powershift transmission system of claim 11, wherein the first gear ratio is more than twice the second gear ratio, and the first gear ratio is more than twice the third gear ratio.

13. The powershift transmission system of claim 11, wherein the first gear ratio is 2.360.

14. The powershift transmission system of claim 13, wherein the first speed gear has 25 teeth, and the second speed gear has 59 teeth.

15. The powershift transmission system of claim 10, wherein the controller is configured to output one or more second signals indicative of instructions to engage the speed B clutch, to disengage the speed A clutch, and to disengage the speed C clutch to establish a lowest gear ratio of the powershift transmission.

16. A powershift transmission for a work vehicle, comprising
a range section, comprising:
a range input shaft;
a range countershaft;
three range clutches and six range gears configured to control a power flow path between the range input shaft and the range countershaft;
a seventh range gear coupled to the range countershaft and configured to rotate with the range countershaft; and
an eighth range gear engaged with the seventh range gear, wherein the eighth range gear is configured to couple to a rear axle input shaft;
wherein a first gear ratio between the seventh range gear and the eighth range gear is less than 1.900.

17. The powershift transmission of claim 16, wherein the first gear ratio between the seventh range gear and the eighth range gear is 1.808.

18. The powershift transmission of claim 16, wherein the three range clutches comprise:
a range low clutch coupled to the range countershaft;
a range mid clutch coupled to the range input shaft; and
a range high clutch coupled to the range input shaft;
wherein the six range gears comprise:
a first range gear coupled to the range input shaft and configured to rotate with the range input shaft;
a second range gear coupled to the range low clutch and engaged with the first range gear;
a third range gear coupled to the range mid clutch;
a fourth range gear coupled to the range countershaft and configured to rotate with the range countershaft, wherein the fourth range gear is engaged with the third range gear;
a fifth range gear coupled to the range high clutch; and
a sixth range gear coupled to the range countershaft and configured to rotate with the range countershaft, wherein the sixth range gear is engaged with the fifth range gear;
wherein the range low clutch is engageable to transfer rotational power from the range input shaft to the range countershaft via the first and second range gears, the range mid clutch is engageable to transfer rotational power from the range input shaft to the range countershaft via the third and fourth range gears, and the range high clutch is engageable to transfer rotational power from the range input shaft to the range countershaft via the fifth and sixth range gears.

19. The powershift transmission of claim 16, comprising a speed section configured to transfer rotational power to the range input shaft, wherein the speed section comprises:
a speed input shaft configured to be driven in rotation by an input;
a speed countershaft;
a speed A clutch coupled to the speed input shaft;
a speed B clutch coupled to the speed input shaft;
a speed C clutch coupled to the speed countershaft;
a first speed gear coupled to the speed input shaft and configured to rotate with the speed input shaft;
a second speed gear coupled to the speed C clutch and engaged with the first speed gear;
a third speed gear coupled to the speed A clutch;
a fourth speed gear coupled to the speed countershaft and configured to rotate with the speed countershaft, wherein the fourth speed gear is engaged with the third speed gear;
a fifth speed gear coupled to the speed B clutch; and
a sixth speed gear coupled to the speed countershaft and configured to rotate with the speed countershaft, wherein the sixth speed gear is engaged with the fifth speed gear;
wherein the speed A clutch is engageable to transfer rotational power from the speed input shaft to the speed countershaft via the third and fourth speed gears, the speed B clutch is engageable to transfer rotational power from the speed input shaft to the speed countershaft via the fifth and sixth speed gears, and the speed C clutch is engageable to transfer rotational power from the speed input shaft to the speed countershaft via the first and second speed gears.

20. The powershift transmission of claim 19, wherein a second gear ratio between the first and second speed gears is greater than a third gear ratio between the third and fourth speed gears and a fourth gear ratio between the fifth and sixth speed gears.

* * * * *